(12) United States Patent
Dagström

(10) Patent No.: US 10,988,182 B2
(45) Date of Patent: Apr. 27, 2021

(54) VEHICLE STRUCTURE

(71) Applicant: Volvo Car Corporation, Gothenburg (SE)

(72) Inventor: Josef Dagström, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 117 days.

(21) Appl. No.: 16/379,959

(22) Filed: Apr. 10, 2019

(65) Prior Publication Data
US 2019/0344834 A1  Nov. 14, 2019

(30) Foreign Application Priority Data
May 8, 2018 (EP) .................................... 18171186

(51) Int. Cl.
| | |
|---|---|
| *B62D 25/06* | (2006.01) |
| *B62D 25/08* | (2006.01) |
| *B62D 27/02* | (2006.01) |
| *B62D 27/06* | (2006.01) |
| *B62D 29/00* | (2006.01) |
| *B62D 65/02* | (2006.01) |

(52) U.S. Cl.
CPC .......... *B62D 25/06* (2013.01); *B62D 25/081* (2013.01); *B62D 27/02* (2013.01); *B62D 27/026* (2013.01); *B62D 27/065* (2013.01); *B62D 29/008* (2013.01); *B62D 65/02* (2013.01)

(58) Field of Classification Search
CPC ...... B62D 25/06; B62D 25/081; B62D 27/02; B62D 27/026; B62D 27/065; B62D 29/008; B62D 65/02; B62D 27/023; B62D 25/02; B62D 25/00

USPC .......................................................... 296/210
See application file for complete search history.

(56) References Cited

U.S. PATENT DOCUMENTS

| | | | | |
|---|---|---|---|---|
| 7,165,806 B2* | 1/2007 | Osterberg | ............. | B62D 25/06 |
| | | | | 296/203.03 |
| 8,042,863 B2* | 10/2011 | Nydam | ................. | B62D 33/08 |
| | | | | 296/210 |
| 2006/0202518 A1 | 9/2006 | Osterberg et al. | | |
| 2007/0200314 A1 | 8/2007 | Anderson et al. | | |
| 2010/0127532 A1 | 5/2010 | Hosaka et al. | | |
| 2012/0126582 A1 | 5/2012 | Kishi | | |
| 2013/0320716 A1 | 12/2013 | Nishimura et al. | | |

(Continued)

FOREIGN PATENT DOCUMENTS

| | | |
|---|---|---|
| EP | 3009333 A1 | 4/2016 |
| WO | 2015111706 A1 | 7/2015 |

OTHER PUBLICATIONS

Nov. 5, 2018 European Search Report issue on International Application No. EP18171186.

*Primary Examiner* — Pinel E Romain
(74) *Attorney, Agent, or Firm* — Clements Bernard Walker; Christopher L. Bernard

(57) ABSTRACT

The embodiments herein relate to a structure for a vehicle. The structure includes a transverse rail, an inner side rail and an outer side rail both extending at an angle (α) from an end of the transverse rail. The structure further includes a connecting part having a first leg and a second leg. The transverse rail and the inner side rail are joined together via the connecting part such that the first leg is connected to the transverse rail and the second leg is located between the inner side rail and the outer side rail.

14 Claims, 8 Drawing Sheets

(56) References Cited

U.S. PATENT DOCUMENTS

| | | |
|---|---|---|
| 2016/0101672 A1 | 4/2016 | Oshima |
| 2016/0107698 A1 | 4/2016 | Oshima et al. |
| 2016/0129944 A1 | 5/2016 | Nishimura et al. |
| 2016/0264183 A1 | 9/2016 | Saito |
| 2018/0346034 A1* | 12/2018 | Sheldon ............... B62D 27/026 |

* cited by examiner

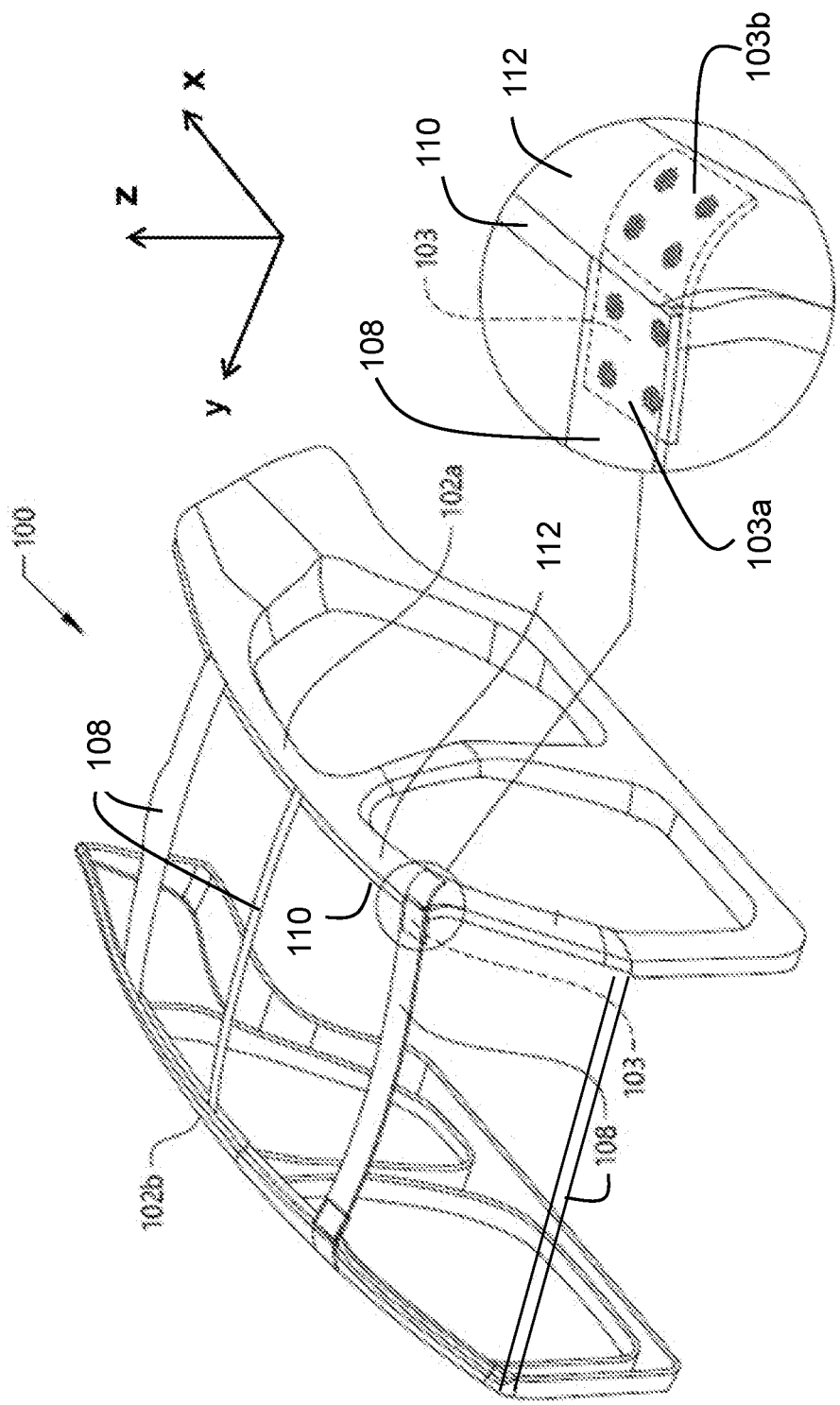

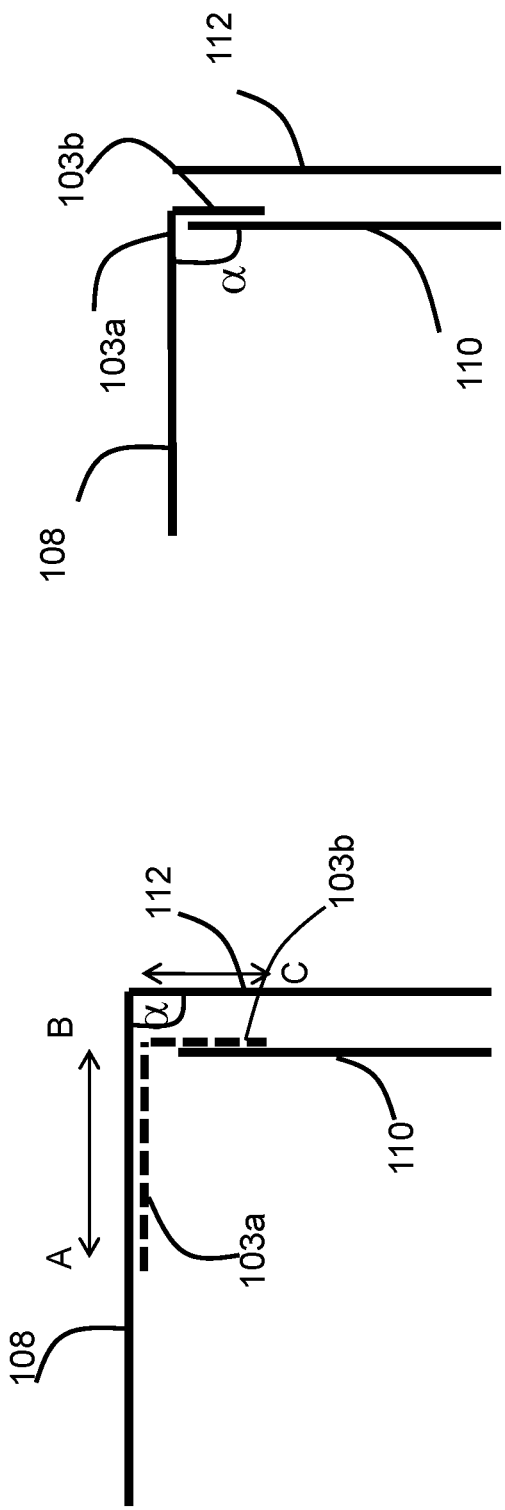
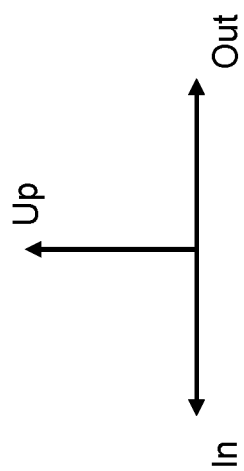
Fig. 3b
Fig. 3c

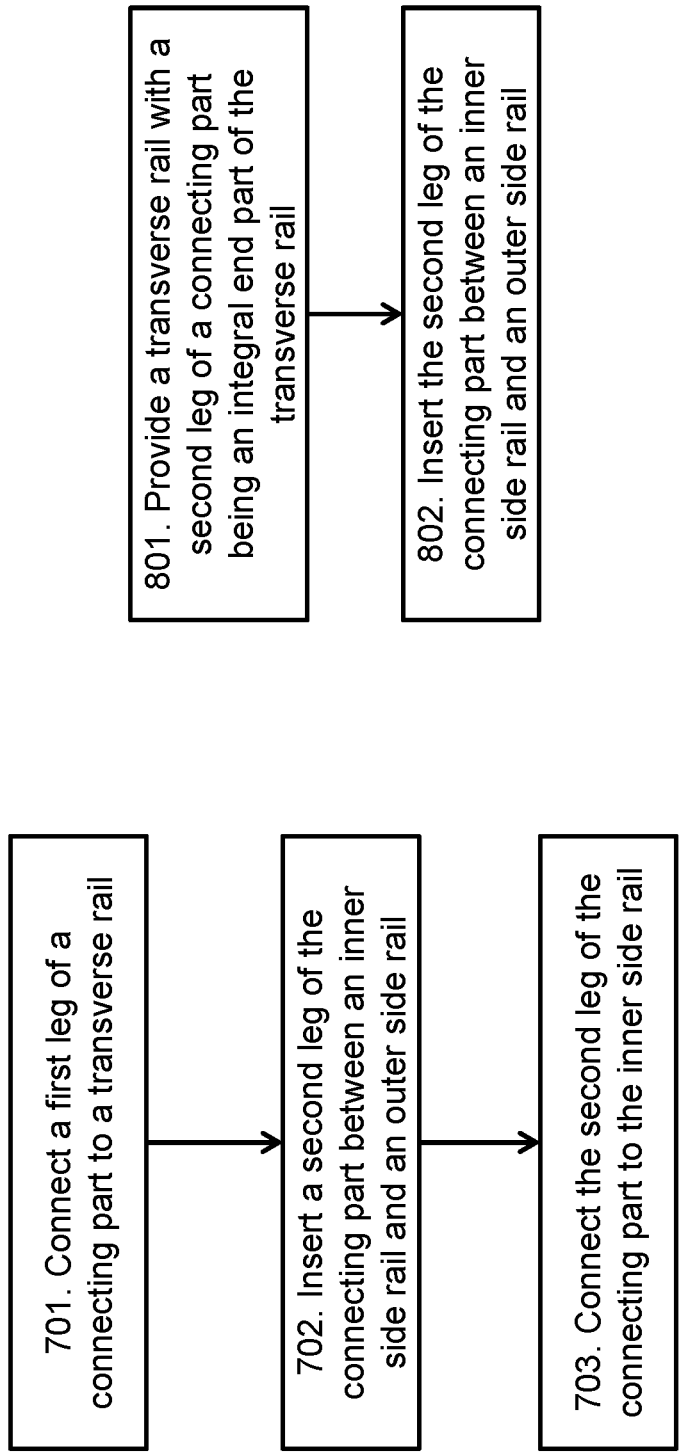

VEHICLE STRUCTURE

CROSS-REFERENCE TO RELATED APPLICATION

The present disclosure claims the benefit of priority of co-pending European Patent Application No. 18171186.2, filed on May 8, 2018, and entitled "VEHICLE STRUCTURE," the contents of which are incorporated in full by reference herein for all purposes.

TECHNICAL FIELD

Embodiments herein relate generally to a structure, a vehicle including the structure and a method for assembly of the structure. Embodiments herein relate more specifically to a rail structure for strengthening the roof of a vehicle.

BACKGROUND

There are high requirements on a vehicle's ability to withstand collisions. It can be crucial for the vehicle's occupants if some parts of the vehicle do not sufficiently withstand a collision. Therefore, vehicle manufacturers are constantly striving to improve the vehicle's ability to withstand impact in a manner beneficial to the vehicle's occupants.

In case of collisions, some parts of the vehicle are more exposed to damages than others. When a vehicle collides with a large animal such as a bear, a reindeer or a moose running in front of the vehicle, the roof rail and the front header of the vehicle are examples of parts that need to withstand a large impact.

Therefore, there is a need to at least mitigate or solve these issues.

SUMMARY

An objective of embodiments herein is therefore to obviate at least one of the above disadvantages and to provide an improved vehicle structure.

According to a first aspect, the object is achieved by a structure for a vehicle. The structure includes a transverse rail. The structure further includes an inner side rail and an outer side rail both extending at an angle from an end of the transverse rail. The structure includes a connecting part having a first leg and a second leg. The transverse rail and the inner side rail are joined together via the connecting part such that the first leg is connected to the transverse rail and the second leg is located between the inner side rail and the outer side rail.

According to a second aspect, the object is achieved by a vehicle including the structure.

According to a third aspect, the object is achieved by a method for assembly of a vehicle structure. The method includes:

Connecting a first leg of a connecting part to a transverse rail.

Inserting a second leg of the connecting part between an inner side rail and an outer side rail. The inner side rail and the outer side rail both extend at an angle from an end of the transverse rail.

According to a fourth aspect, the object is achieved by a method for assembly of a vehicle structure. The method includes:

Providing a transverse rail with a second leg of a connecting part being an integral end part of the transverse rail.

Inserting the second leg of the connecting part between an inner side rail and an outer side rail. The inner side rail and the outer side rail both extending at an angle from an end of the transverse rail.

Since a leg of the connecting part is located between the inner and outer side rails, an improved vehicle structure is provided. With this location, the connecting part is exposed to strain forces when the vehicle collides with e.g. a large animal, this provides greater resistance compared to when being subject to pull forces that would arise if the leg of the connecting part where connected to the side of the inner rail facing the transverse rail.

An advantage of the embodiments herein is that with the connecting part being inserted between the inner and outer side rails, the connection to the transverse rail is exposed to strain instead of pull forces, which provides good resistance during a collision.

Another advantage of the embodiments herein is that the connection of the horizontal rail and the inner side rail become stronger. As a result, the connecting part can be lighter and cheaper.

Another advantage of the embodiments herein is that the material strength, and not the connection, will be the weakest point of the design. This way the embodiments herein provide a robust and predicted crash behaviour.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which:

FIG. 2 is a schematic drawing illustrating a partially assembled vehicle.

FIG. 3b-3c are schematic drawings illustrating a structure in accordance with the embodiments herein.

FIG. 7 is a flow chart illustrating a method.

FIG. 8 is a flow chart illustrating a method.

The drawings are not necessarily to scale and the dimensions of certain features may have been exaggerated for the sake of clarity. Emphasis is instead placed upon illustrating the principle of the embodiments herein.

DESCRIPTION OF EMBODIMENTS

Figure 1:
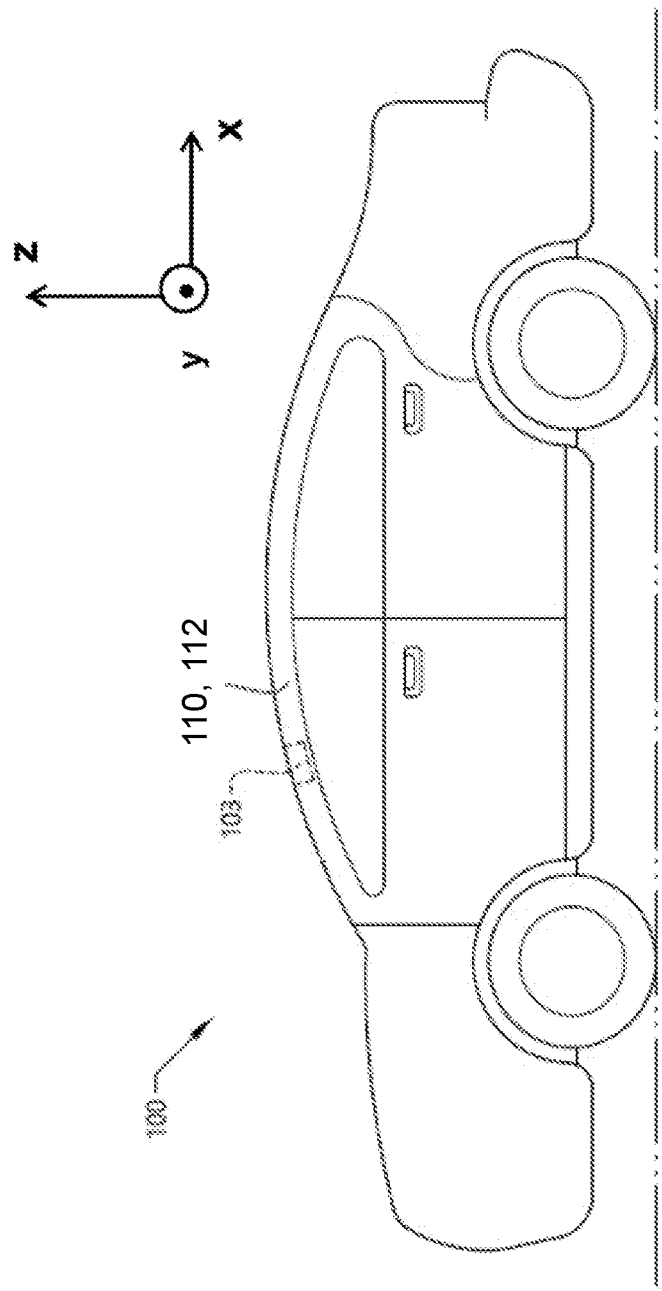
FIG. 1 is a schematic drawing illustrating a vehicle.

FIG. 1 illustrates a vehicle 100. The vehicle 100 may be any arbitrary vehicle, for instance a car, truck, lorry, van, bus etc. The vehicle 100 may be at least partly autonomous or self-driven, it may be completely autonomous or self-driven, or it may be non-autonomous etc. The vehicle 100 includes a structure, and the structure includes a transverse rail 108

(not illustrated in FIG. 1, but in FIG. 2), an inner side rail 110 and an outer side rail 112. The transverse rail 108 and the inner side rail 110 are joined together via a connecting part 103. These parts of the structure will be described in more detail below with reference to FIGS. 2-7 below.

A coordinate system is illustrated in FIG. 1 which shows that the x-axis represents the direction backwards in the vehicle 100, the z-axis represents the upwards direction and the y-axis represents the left direction seen from the front of the vehicle 100.

Directions as used herein, e.g. horizontal, vertical, lateral, relate to when the structure is mounted in the vehicle 100 with the vehicle standing on flat ground. The structure may be manufactured, stored, transported and sold as a separate unit. In that case, the directions may differ from when mounted in the vehicle 100.

FIG. 2 is a schematic drawing illustrating the structure for the vehicle 100 in more detail compared to FIG. 1. In FIG. 2, the structure is seen without the vehicle's outer skin panels. FIG. 2 shows that the structure has two sides, e.g. a first side 102a and a second side 102b. The first side 102a may be referred to as a right side and the second side 102b may be referred to as a left side when viewing the structure and the vehicle 100 from the front. FIG. 2 also shows the transverse rail 108. The transverse rail 108 may be described as extending horizontally from the first side 102a to the second side 102b of the structure.

The transverse rail 108 may be a front roof rail, a middle roof rail, a back roof rail or a cowl. The inner side rail 110 may also be referred to as a cantrail, an A-pillar etc. or as a part thereof. A cantrail of a vehicle may be described as the structural member running over the top of the doors. The outer side rail 112 is located essentially in parallel to the inner side rail 110, and in certain regions of overlap there may be a gap between them. The inner side rail 110 is located closer to the transverse rail 108 than the outer side rail 112 in the y-direction. The "inner" in the term inner side rail 110 means that it is closer to the inside of the vehicle 100 and the "outer" in the term outside rail 112 means that the rail is closer to the outside of the vehicle 100.

In FIG. 2, the connecting part 103 is exemplified as being connected to the transverse rail 108 serving as a front roof rail, though it is to be understood that it can be connected to any or each of the middle roof rail, back roof rail or cowl. A cowl is the transverse rail 108 located under the windshield of the vehicle 100.

The circle in FIG. 2 provides an enlarged view of the connecting part 103 which joins the transverse rail 108 and the inner side rail 110 together. The connecting part 103 may also be referred to as a reinforcement member, a support member, a gusset, etc. The connecting part 103 may be an integral end part of the transverse rail 108 or it may be a bracket. FIG. 2 shows an example where the connecting part 103 is a bracket. The connecting part 103 includes a first leg 103a and a second leg 103b. The connecting part 103 joins the transverse rail 108 and the inner side rail 110 together such that the first leg 103a of the connecting part 103 is connected to the transverse rail 108 and the second leg 103b of the connecting part 103 is located between the inner side rail 110 and the outer side rail 112.

The inner side rail 110 and the outer side rail 112 may extend essentially vertically in a front-rear direction of the vehicle 100, and the transverse rail 108 may extend essentially horizontally in a right-left direction of the vehicle 100.

The inner side rail 110 may be located closer to the transverse rail 108 than the outer side rail 112.

Figure 3A:
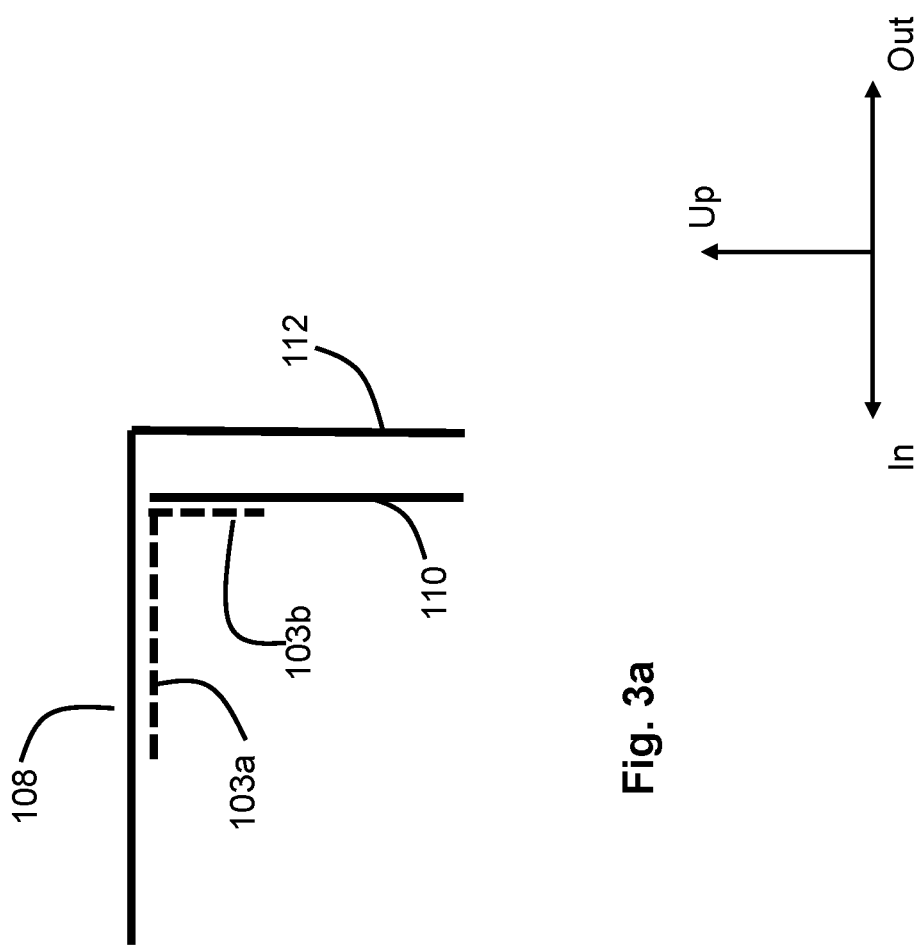
FIG. 3a is a schematic drawing illustrating a known structure.

Before continuing to describe the embodiments herein, a known connecting part 103 will be described. FIG. 3a is a schematic drawing of a section of a known structure seen from the front of the vehicle 100. The coordinate system in FIG. 3a illustrates in, up and out of the vehicle 100. It is shown in FIG. 3a that the first leg 103a of the known connecting part 103 is connected to the transverse rail 108 and the second leg 103b of the connecting part 103 is connected to the inner side rail 110, i.e. to a side of the inner sider rail 110 which faces the inside of the vehicle 100. When the vehicle 100 with such known structure collides with, for example, a large animal, the connecting part 103 is exposed to pull forces which leads to the connection between the transverse rail 108 and the inner side rail 110 being severely damaged and possibly broken. Thus, the known connecting part 103 is a relatively weak part when the vehicle 100 is involved in a collision.

Now returning to the embodiments herein; FIG. 3b and FIG. 3c are schematic drawings illustrating the same section of the structure as in FIG. 3a. FIG. 3b illustrates an example in which the connecting part 103 is a bracket and FIG. 3c illustrates an example in which the connecting part 103 is an integral end part of the transverse rail 108. When the connecting part 103 is a bracket, it is a separate unit. When the connecting part 103 is an integral end part of the transverse rail 108, the end part may be bent such that it can be located between the inner side rail 110 and the outer side rail 112.

As clearly seen in both FIGS. 3b and 3c, the second leg 103b of the connecting part 103 is located between the inner side rail 110 and the outer side rail 112 of the structure, as contrary to being located between the inner side rail 110 and the inside of the vehicle 100 in the known structure in FIG. 3a. The second leg 103b in FIGS. 3b and 3c is located at a different side of the inner side rail 110 compared to the known connecting part 103 in FIG. 3a. When the second leg 103b is located between the inner side rail 110 and the outer side rail 112, the connecting part 103 is exposed to strain forces in case the vehicle 100 collides with e.g. a large animal. The connecting part 103 when being exposed to strain forces has a larger resistance to damage and breaking compared to pull forces as in the known connection 103 illustrated in FIG. 3a.

For example, if the known connecting part 103 in FIG. 3a is connected to the transverse rail 108 and the inner side rail 110 by spot welds, these spot welds have a risk of failing during large animal impacts on the structure. For the connecting part 103 in FIGS. 3b and 3c according to the embodiments herein, only the material itself is the weakest point, not the spot welds, because of the location of the connection part 103 between the inner side rail 110 and the outer side rail 112.

FIG. 3a and FIG. 3b illustrate that the inner side rail 110 and an outer side rail 112 both extend at an angle α from an end of the transverse rail 108. The angle may preferably be 70°-180°, more preferably in the range 80°-150° and most preferably in the range 90°-110°.

Figure 4:
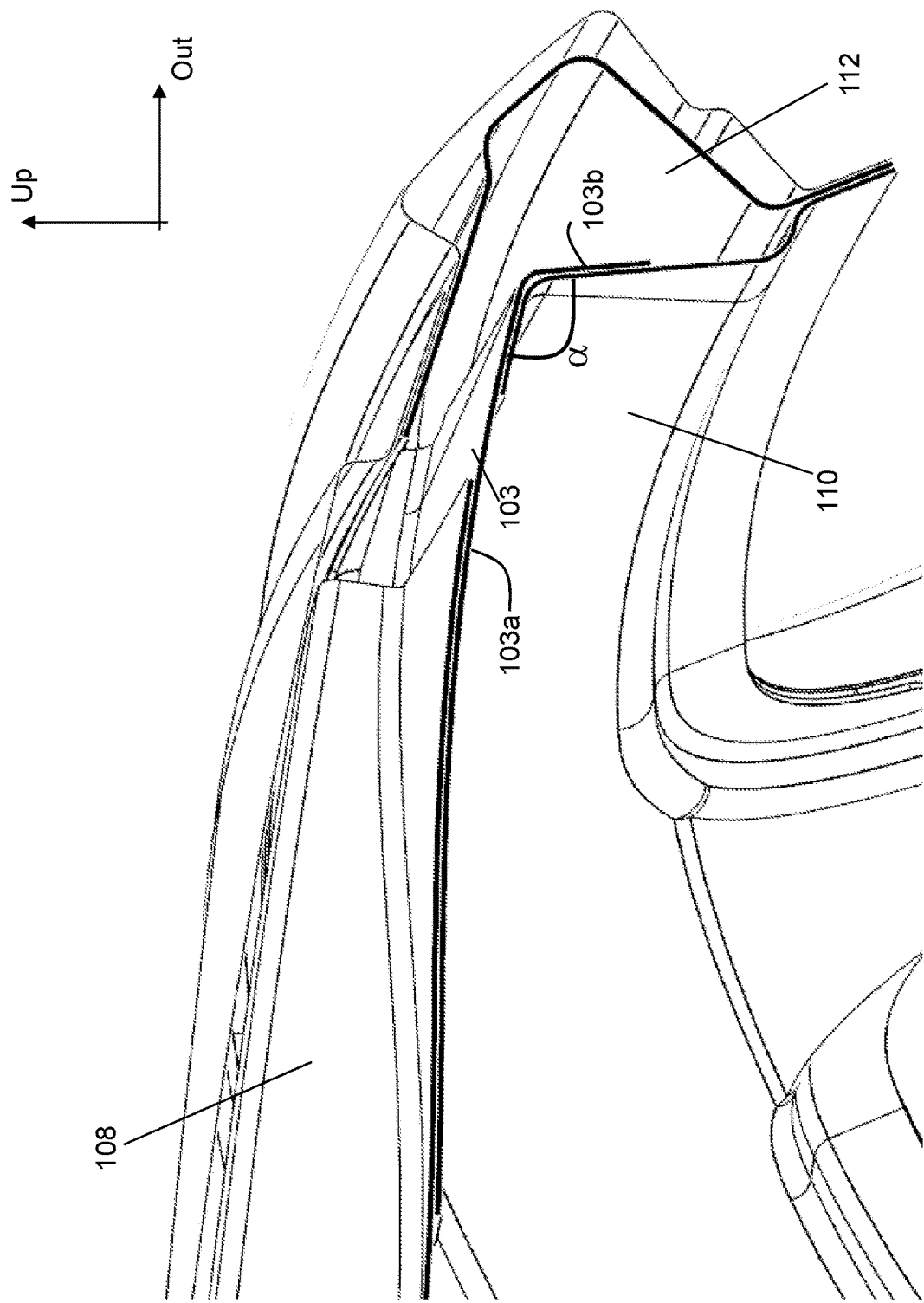
FIG. 4 is a schematic drawing illustrating a structure in accordance with the embodiments herein.

FIG. 4 illustrates a cross section of a part of a structure according to the embodiments herein. The connecting part 103 is exemplified as a bracket in FIG. 4. The first leg 103a is connected to a bottom side of the transverse rail 108. However, the first leg 103a may instead be connected to a top side of the transverse rail 108, where top refers to the side facing away from the vehicle's inside and bottom refers to the side facing towards the vehicle's inside. The second leg 103b of the connecting part 103 is located between the inner side rail 110 and the outer side rail 112 and connected to the inner side rail 110.

Figure 5:
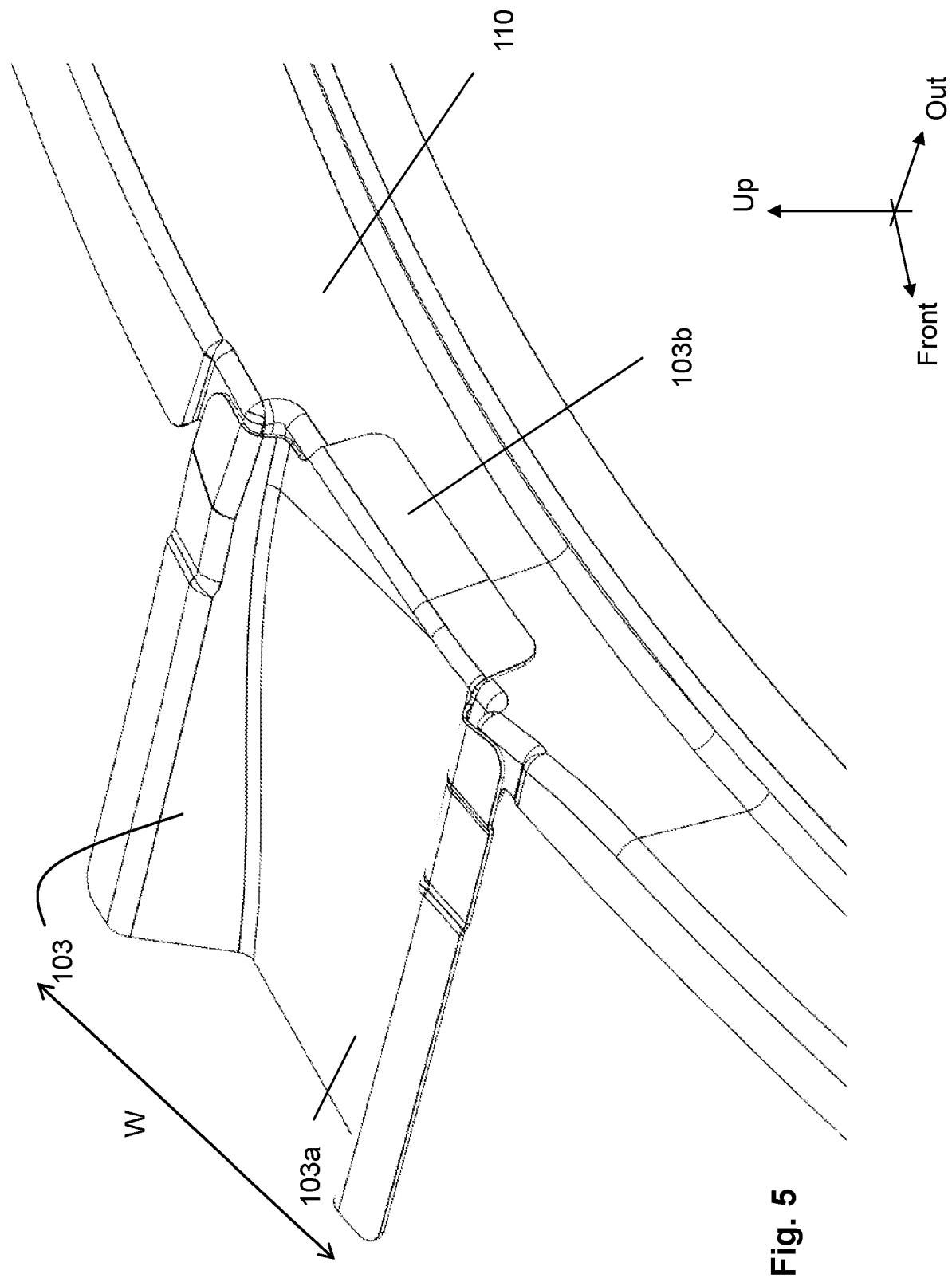
FIG. 5 is a schematic drawing illustrating a further structure in accordance with the embodiments herein.

FIG. 5 is another schematic illustration of the structure. The outer side rail 112 and the transverse rail 108 are not shown in FIG. 5. From FIG. 5, and also from FIGS. 2-4, it is shown that the connecting part 103 is substantially L-shaped. The first leg 103a forms one branch of the L-shape and the second leg 103b forms another branch of the L-shape. Furthermore, there is an angle between the first leg 103a and the second leg 103b. The angle is larger than zero. The angle may be substantially the same as the angle α between the transverse rail 108 and the inner side rail 110 and the outer side rail 112 as indicated in FIGS. 3c and 4. The angle may preferably be 70°-180°, more preferably in the range 80°-150° and most preferably in the range 90°-110°.

The connecting part 103 has a length, i.e. the combined length of the first leg 103a and the second leg 103b, which is seen as the length from A to B and from B to C in FIG. 3b. The length may preferably be 50-500 mm, more preferably 100-400 mm and most preferably 200-300 mm. The connecting part 103 may have a width (W) of preferably 50-500 mm, more preferably 85-300 mm and most preferably 150-230 mm. This is illustrated with reference letter W in FIG. 5. As seen in FIG. 5, the first leg 103a may be longer than the second leg 103b. The length of the second leg 103b may be limited to the height of the inner side rail 110. The length of the first leg 103a may be longer because the mounting of the sun visor foot is integrated into that part. However, the second leg 103b may instead be longer than the first leg 103a, or the first and second legs 103a, 103b may have substantially the same length. For example, the first leg 103a may preferably be 1-10 times longer than the second leg 103b, more preferably 2-8 times longer than the second leg 103b and most preferably 3-6 times longer than the second leg 103b.

As mentioned earlier, the connecting part 103 may substantially be L-shaped. The connection part 103 may in addition have edges, brims, grooves, patterns etc. This is in order for the connecting part 103 to fit to the shapes of the transverse rail 108 and the inner side rail 110. The shape of the first leg 103a may be the same or it may be different from the shape of the second leg 103b since the transverse rail 108 and the inner side rail 110 may have different shapes.

Figure 6:
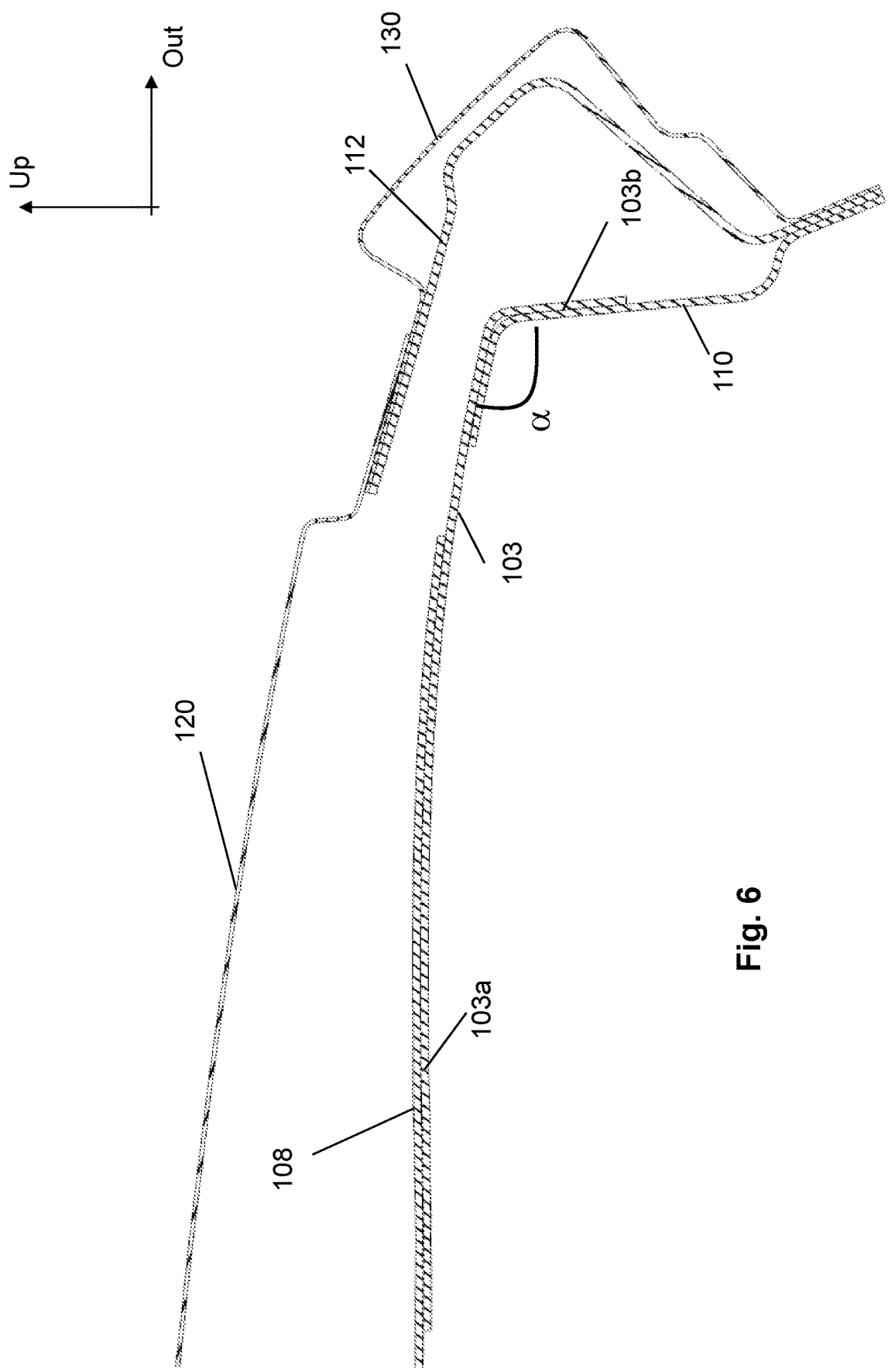
FIG. 6 is a schematic drawing illustrating another structure in accordance with the embodiments herein.

FIG. 6 illustrates a cross section of a structure with the connecting part 103. FIG. 6 also shows the inner side rail 110, the outer side rail 112, a roof sheet 120 and an outer skin panel 130. The first leg 103a is shown in FIG. 6 to be directly connected to the transverse rail 108. However, the first leg 103a may instead be indirectly connected to the transverse rail 108 via some spacing material between them. Similarly, the second leg 103b which is illustrated in FIG. 6 is shown as being directly connected to the inner side rail 110. However, the second leg 103b may instead be indirectly connected to the inner side rail 110 via some spacing material between them.

The connecting part 103 may be connected to the transverse rail 108 and to the inner side rail 110 by a connecting means. The connecting means may be welding, gluing, one or more nuts and bolts or by brazing, or by any combination of two or more of these means. The same connecting means may be used for connecting both the first and second legs 103a, 103b or different connecting means may be used. The connecting may be achieved from the side facing the outer side rail 112, thereby expose the connection 103 to shear loads rather than pull loads.

The connecting part 103 may be made of aluminum, steel, an aluminum alloy or a steel alloy. The connecting part 103 may be made of the same material as the transverse rail 108 and the inner side rail 110, or it may be made of a different material than these rails.

The embodiments herein further relate to a vehicle 100 including the structure as described above.

A method for assembly of a vehicle structure, according to some embodiments will now be described with reference to the flowchart depicted in FIG. 7. FIG. 7 illustrates an embodiment where the connecting part 103 is in the form of a bracket. The method includes at least one of the following steps, which steps may as well be carried out in another suitable order than described below:

Step 701: Connect a first leg 103a of a connecting part 103 in the form of a bracket to a transverse rail 108.

The first leg 103a of the connecting part 103 may be connected to a bottom side or a top side of the transverse rail 108.

The connecting part 103 may be substantially L-shaped. The first leg 103a may form one branch of the L-shape and the second leg 103b may form another branch of the L-shape. There may be an angle between the first leg 103a and the second leg 103b. The angle is preferably within the range 70-180°, more preferably 80-150° and most preferably 90-110°.

The transverse rail 108 may be front roof rail, a middle roof rail, a back roof rail or a cowl.

The connecting part 103 may be made of aluminum, steel, an aluminum alloy or a steel alloy.

The connecting part 103 may have a length of preferably 50-500 mm, more preferably 100-400 mm and most preferably 200-300 mm. The connecting part 103 may have a width of 50-500 mm, more preferably 85-300 mm and most preferably 150-230 mm.

Step 702: Insert a second leg 103b of the connecting part 103 between an inner side rail 110 and an outer side rail 112. The inner side rail 110 and the outer side rail 112 both extend at an angle from an end of the transverse rail 108.

The inner side rail 110 and the outer side rail 112 may extend essentially vertically in a front-rear direction of the vehicle 100, and the transverse rail 108 may extend essentially horizontally in a right-left direction of the vehicle 100.

The inner side rail 110 may be located closer to the transverse rail 108 than the outer side rail 112.

Step 703: Connect the second leg 103b of the connecting part 103 to the inner side rail 110.

The connecting part 103, when being in the form of a bracket, may be connected to the transverse rail 108 and to the inner side rail 110 by welding, gluing, nut and bolt or by brazing, or by a combination of two or more of these means.

A method for assembly of a vehicle structure, according to some embodiments will now be described with reference to the flowchart depicted in FIG. 8. FIG. 8 illustrates an embodiment where the connecting part 103 is an integral end part of the transverse rail 108. The method includes at least one of the following steps, which steps may as well be carried out in another suitable order than described below:

Step 801: Provide a transverse rail 108 with a second leg 103b of a connecting part 103 being an integral end part of the transverse rail 108.

The connecting part 103 may be substantially L-shaped. A first leg 103a may form one branch of the L-shape and the second leg 103b may form another branch of the L-shape. There may be an angle between the first leg 103a and the second leg 103b. The angle is preferably within the range 70-180°, more preferably 80-150° and most preferably 90-110°.

The transverse rail 108 may be front roof rail, a middle roof rail, a back roof rail or a cowl.

The connecting part 103 may be made of aluminum, steel, an aluminum alloy or a steel alloy.

The connecting part 103 may have a length of preferably 50-500 mm, more preferably 100-400 mm and most preferably 200-300 mm. The connecting part 103 may have a width of 50-500 mm, more preferably 85-300 mm and most preferably 150-230 mm.

Step 802: Insert the second leg 103b of the connecting part 103 between an inner side rail 110 and an outer side rail 112. The inner side rail 110 and the outer side rail 112 both extend at an angle from an end of the transverse rail 108.

The inner side rail 110 and the outer side rail 112 may extend essentially vertically in a front-rear direction of the vehicle 100, and the transverse rail 108 may extend essentially horizontally in a right-left direction of the vehicle 100.

The inner side rail 110 may be located closer to the transverse rail 108 than the outer side rail 112.

The connecting part 103, when being an integral part of the transverse rail 108, may be connected to the inner side rail 110 by welding, gluing, nut and bolt or by brazing, or by a combination of two or more of these means.

The embodiments herein are not limited to the above described embodiments.

Various alternatives, modifications and equivalents may be used. Therefore, the above embodiments should not be taken as limiting the scope of the embodiments, which is defined by the appended claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A structure for a vehicle, the structure comprising:
a transverse rail adapted to extend in a transverse direction across the vehicle;
an inner side rail and an outer side rail both extending at an angle (□) from an end of the transverse rail; and
a connecting part having a first leg and a second leg, wherein the transverse rail and the inner side rail are joined together via the connecting part such that the first leg is connected to the transverse rail and the second leg is located between the inner side rail and the outer side rail.

2. The structure according to claim 1, wherein the connecting part is an integral end part of the transverse rail.

3. The structure according to claim 1, wherein the connecting part is a bracket.

4. The structure according to claim 1, wherein the second leg of the connecting part is connected to the inner side rail.

5. The structure according to claim 3, wherein the first leg of the connecting part is connected to a bottom side or a top side of the transverse rail.

6. The structure according to claim 1, wherein the connecting part is substantially L-shaped, the first leg forming one branch of the L-shape and the second leg forming another branch of the L-shape, wherein there is an angle between the first leg and the second leg, said angle preferably being within the range 70-180°.

7. The structure according to claim 1, wherein the connecting part is connected to the transverse rail and/or to the inner side rail by welding, gluing, nut and bolt or by brazing, or by any combination thereof.

8. The structure according to claim 1, wherein the transverse rail is a front roof rail, a middle roof rail, a back roof rail or a cowl.

9. The structure according to claim 1, wherein the inner side rail and the outer side rail extend essentially vertically in a front-rear direction of the vehicle, and the transverse rail extends essentially horizontally in a right-left direction of the vehicle.

10. The structure according to claim 1, wherein the inner side rail is located closer to the transverse rail than the outer side rail.

11. The structure according to claim 1, wherein the connecting part is made of aluminum, steel, an aluminum alloy or a steel alloy.

12. The structure according to claim 1, wherein the connecting part has a length of preferably 50-500 mm, wherein the connecting part has a width of 50-500 mm.

13. A method for assembly of a vehicle structure, the method comprising:
connecting a first leg of a connecting part to a transverse rail adapted to extend in a transverse direction across the vehicle, wherein the connecting part is in the form of a bracket; and
inserting a second leg of the connecting part between an inner side rail and an outer side rail, the inner side rail and the outer side rail both extending at an angle from an end of the transverse rail.

14. A method for assembly of a vehicle structure, the method comprising:
providing a transverse rail adapted to extend in a transverse direction across the vehicle with a second leg of a connecting part, wherein the connecting part is an integral end part of the transverse rail; and
inserting the second leg of the connecting part between an inner side rail and an outer side rail, the inner side rail and the outer side rail both extending at an angle from an end of the transverse rail.

* * * * *